July 14, 1970  J. D. GORDON  3,520,277
BREADER WITH FLOUR SIFTER

Filed May 13, 1968  2 Sheets-Sheet 1

INVENTOR.
Jerry D. Gordon
BY
Young & Thompson
ATTORNEYS

July 14, 1970    J. D. GORDON    3,520,277
BREADER WITH FLOUR SIFTER
Filed May 13, 1968    2 Sheets-Sheet 2
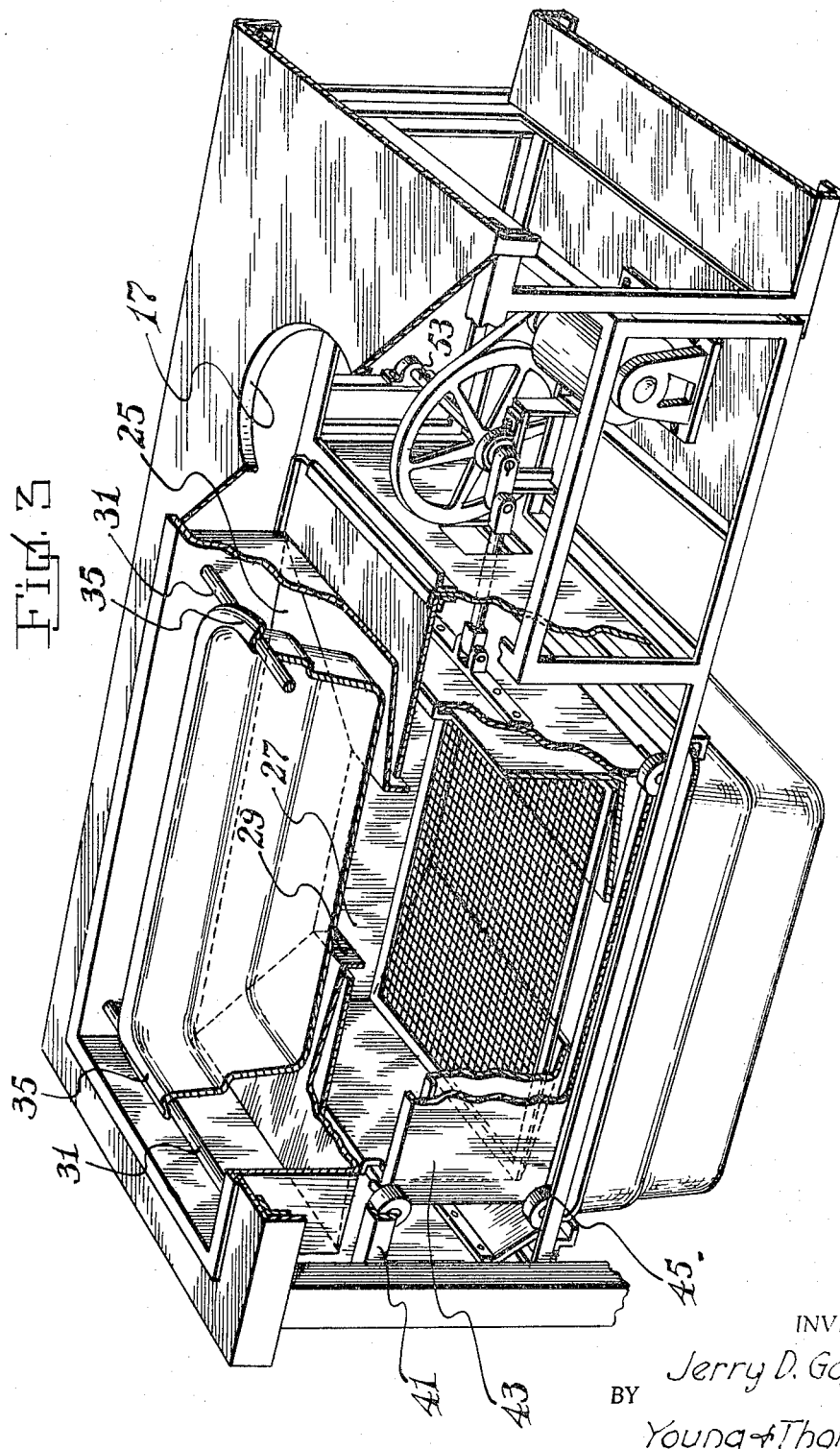
INVENTOR.
Jerry D. Gordon
BY
Young & Thompson
ATTORNEYS

United States Patent Office 3,520,277
Patented July 14, 1970

3,520,277
BREADER WITH FLOUR SIFTER
Jerry D. Gordon, 10749 E. 11th St.,
Tulsa, Okla. 74128
Filed May 13, 1968, Ser. No. 728,563
Int. Cl. B05c 11/00; B07b 1/32
U.S. Cl. 118—23    9 Claims

ABSTRACT OF THE DISCLOSURE

To sift out the clods of flour that accumulate when wet pieces of food are breaded, the breading pan is inverted to dump the entire breading preparation into a sifter. In use, the breading pan rests in the sifter hopper.

---

The present invention relates to breaders with flour sifters, more particularly of the type in which pieces of foods such as chicken are drenched in liquid and then wallowed in a quantity of breading preparation containing flour, wherein excess liquid forms clods of flour.

In the breading of food such as chicken or shrimp or other food to be deep fried, in establishments such as carry-out shops and restaurants, the formation of clods in the breading mixture is a serious problem. Drops of liquid from the food to be breaded, or excess liquid from the food, form lumps in the breading preparation until the preparation is almost unusable.

However, the breading preparation is too expensive simply to be thrown away at this point. Therefore, for economical operation, it is necessary to be able to reclaim as much of the breading preparation as possible.

Accordingly, it is an object of the present invention to provide a breader with a flour sifter such that maximum reclamation of breading preparation can be achieved.

Another object of the present invention is the provision of a breader with flour sifter, in which reclamation of the breading preparation can be effected without the need for the operator leaving the breading station.

Still another object of the present invention is the provision of a breader with flour sifter, in which wasteful spillage of the breading preparation is avoided.

Finally, it is an object of the present invention to provide a breader with flour sifter which will be relatively simple and inexpensive to manufacture, easy to assemble, install, clean, operate, maintain and repair, and rugged and durable in use.

Other objects and advantages of the present invention will become apparent from a consideration of the following description, taken in connection with the accompanying drawings, in which:

FIG. 3 is an enlarged perspective view of the present invention, with parts broken away for clarity of illustration.

Figure 1:
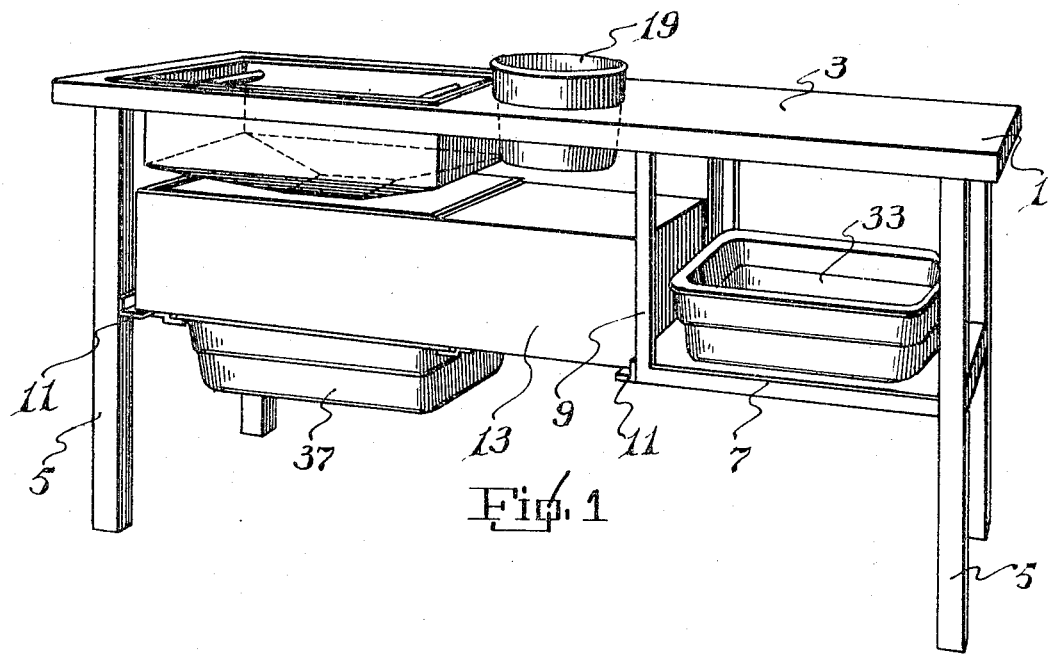
FIG. 1 is a perspective view of a breader with flour sifter according to the present invention.

Referring now to the drawings in greater detail, there is shown a breader with flour sifter according to the present invention, comprising a work table 1 having a flat horizontal table top 3 supported adjacent its corners on four upright legs 5. A shelf 7 is supported at one end between a pair of legs 5 and is suspended at its other end by vertical hangers 9 that depend from the underside of table top 3. Shelf 7 and the other pair of legs 5 each support angle irons 11 whose horizontal legs extend toward each other. A housing 13 is thus slidably removably supported at its ends on angle irons 11 a substantial distance below table top 3. A portion of the upper side of housing 13 is closed by a horizontally slidable plate 15 which when open provides access to the interior of housing 13 and which when closed protects the contents of housing 13 against the entry of dirt and grease and other foreign substances.

Table top 3 is provided with a circular opening 17 therein for the reception of an open-topped container 19 for milk or other liquid in which the pieces of food are to be drenched before breading. Table top 3 also has a large rectangular opening therein, on the marginal edges of which rest the outwardly extending flanges 21 at the upper marginal edges of a hopper or pan 23 that has a bottom 25 that slopes to a central opening 27 provided with a downwardly extending flange 29 thereabout. Plate 15 has a central opening therein, and central opening 27 of pan 23 is centered above the opening through plate 15, while flange 29 extends down through that opening through plate 15. The lower edges of flange 29 are disposed below the marginal edges of the central opening through plate 15. Flour passing through opening 27 thus has no opportunity to escape between flange 29 and plate 15 nor otherwise accidentally to leave housing 13.

Pan 23 has a pair of cross rods 31 secured therein, that extend perpendicularly to the length of pan 23 and are horizontal and are spaced from the end walls of pan 23 and are spaced below the upper edges of pan 23 and are spaced a substantial distance above the bottom walls of pan 23. Cross rods 31 support on them a flour pan 33, the outwardly extending flanges 35 of pan 33 resting removably on cross rods 31. The supported, pan 33 is preferably spaced a short distance above the bottom wall of pan 23. It is intended that the act of breading be carried out in pan 33.

Another pan 37, identical to pan 33, is slidably removably supported by its upper outwardly extending flanges upon a pair of channel members 39 whose horizontal flanges extend toward each other. Pan 37 is thus supported on channel members 39 in the same orientation that pan 33 is supported on cross rods 31.

Inside housing 13, along the horizontal upper and lower corners thereof that extend parallel to the length of pans 33 and 37, are mounted tracks 41 in the form of channel members that open toward each other. Rollably supported on tracks 41 is an upright open frame 43 that has rollers 45 in its upper and lower corners. The rollers 45 roll in tracks 41 and thus provide antifriction mountings for rolling movement of frame 43 in housing 13. A connecting rod 47 connects frame 43 to the crank 49 of a pulley 51 mounted for rotation on a shaft 53 carried by bearings in housing 13 and rotated by means of a belt 55 driven by an electric motor 57.

Frame 43 supports at its upper edges the outwardly extending flanges along the upper edges of a sifter box 59. Box 59 is open at its top and removably rests by gravity on and in frame 43. Sifter box 59 has a downwardly inclined bottom 61 in the form of two plates that are spaced apart at their lower ends to define an opening 63 that extends full width of sifter box 59. At the junction between the plates that comprise bottom 61 and the vertical end walls of sifter box 59, a removable screen 65 rests by gravity and extends full length and full width of the interior of sifter box 59. Screen 65 has openings therethrough sufficiently small to prevent the passage of objectionably large clots of flour but sufficiently large to permit unclotted flour and other usable components of the breading composition to fall by gravity through screen 65 and opening 63 and into the pan 37.

Figure 2:
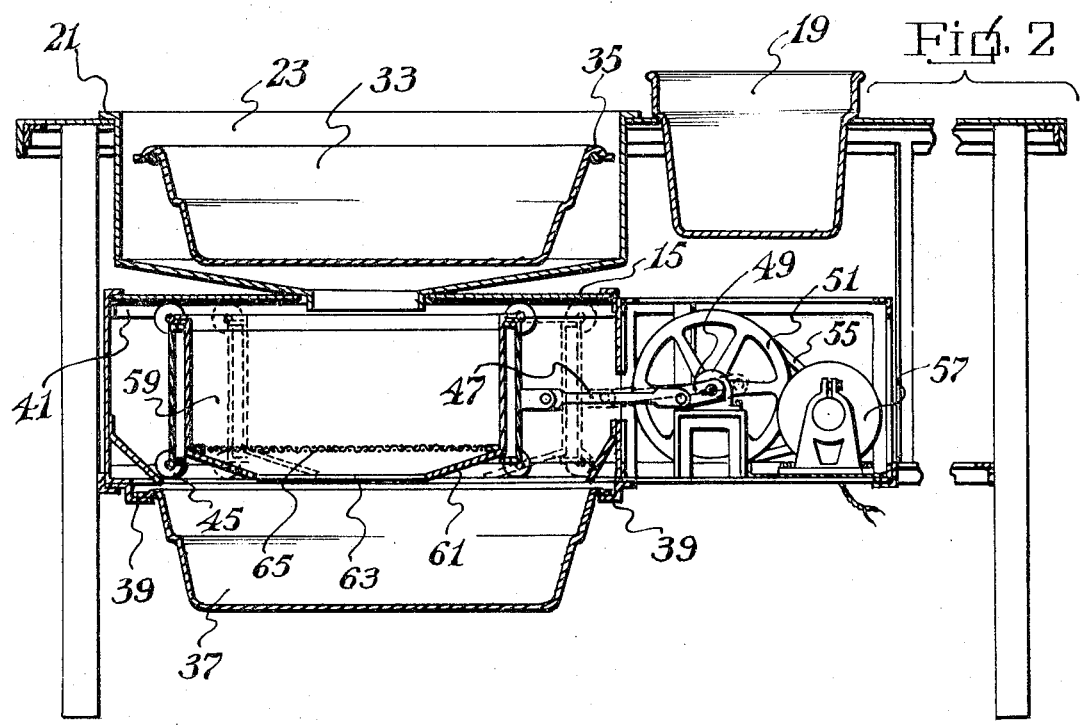
FIG. 2 is a side cross-sectional view of the device of FIG. 1.

In operation, flour pan 33 is filled with breading composition and is placed in the position of FIGS. 2 and 3. With a quantity of drenching liquid in container 19 and a supply of food to be breaded adjacent or on table top 3, the individual pieces of food are grasped by the operator and immersed in the liquid in container 19 and then wallowed in the breading preparation in pan 33 and then placed in a cooking liquid such as deep fat.

From time to time, however, the accumulation of clods in the breading pan 33 becomes undesirably great. Then, with pan 37 in place as shown in FIGS. 2 and 3, the pan 33 is simply picked up and inverted so that the entire breading preparation is dumped into pan 23 and falls or slides by gravity through central opening 27 and into sifter box 59, where a great deal of it comes to rest on screen 65. Motor 57 is then actuated and frame 43 is thus reciprocated horizontally along tracks 41, which agitates the breading preparation on screen 65 to the extent that the reusable portions of the preparation fall through screen 65 and into pan 37.

The emptied pan 33 can be stored on shelf 7, and after the motor 57 has been turned off, the pan 37 with the reusable breading preparation can then be slid horizontally out from its position in FIGS. 2 and 3 and placed on cross rods 31 for the resumption of the breading operation therein. From time to time, as necessary, a small amount of fresh breading preparation may be added to the reused breading preparation, to maintain the quantity of breading preparation at a desirable level in pan 33 or 37. The pan 33 can then be removed from shelf 7 and slid into channel members 39, and breading can be resumed in pan 37 until the operation must be repeated.

From time to time, of course, the quantity of clods that accumulates on screen 65 is so great that they must be removed. To do this, it is necessary only to lift pan 33 or 37 from cross rods 31, to lift pan 23 from its support on the marginal edges of table top 3, to slide plate 15 horizontally to expose frame 43, and then to lift sifter box 59 out of frame 43 and dump the accumulated clods. Alternatively, instead of lifting out sifter box 59, it is permissible, once plate 15 has been removed, merely to tip screen 65 so that the clods fall past screen 65 through opening 63 and thence into the subjacent pan 33 or 37, whence they may be dumped.

In any event, it will be observed that the parts may be readily removed without tools, for cleaning or maintenance or repair, but that in assembled form, the assembly is effectively closed against the entry of foreign substances.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. A breader for pieces of food, comprising a breading pan having an imperforate bottom, a flour sifter disposed below the breading pan, a hopper for directing breading preparation to the flour sifter, and means removably mounting the breading pan in the hopper.

2. A breader as claimed in claim 1, said mounting means comprising fixed cross rods extending across the hopper, said breading pan having outwardly extending flanges along its upper edges that removably rest by gravity on said cross rods.

3. A breader as claimed in claim 2, said cross rods being spaced inwardly from the adjacent walls of the hopper and spaced above the bottom of the hopper.

4. A breader as claimed in claim 3, said cross rods being spaced below the upper edges of the hopper.

5. A breader as claimed in claim 1, and means mounting the sifter for horizontal reciprocating movement thereby to agitate the breading preparation which is being sifted.

6. A breader as claimed in claim 5, said means mounting the sifter for horizontal reciprocal movement comprising an upright open frame, antifriction members carried by the frame, horizontal track means on which said antifriction members ride, and outwardly extending flanges on the upper edges of the sifter that rest by gravity on the upper edges of the upwardly open frame.

7. A breader as claimed in claim 1, and a housing for said sifter, and a second pan removably slidably supported on and by the underside of the housing below said sifter, said second pan and said breading pan being substantially identical and interchangeable.

8. A breader as claimed in claim 7, and a plate removably closing a portion of the upper side of said housing, said plate having an opening therethrough, said hopper having a downwardly depending flange that borders a central opening in the bottom of the hopper, said flange extending through said opening and below said plate.

9. A breader as claimed in claim 1, and a work table on which said breader and sifter are supported, said work table having a table top having an opening therein, said hopper having outwardly extending upper marginal flanges that removably rest by gravity on the margins of said table top opening.

References Cited

UNITED STATES PATENTS

| | | | |
|---|---|---|---|
| 390,948 | 10/1888 | Cuskley | 209—342 |
| 395,639 | 1/1889 | Sweetland | 209—337 X |
| 510,996 | 12/1893 | Sherman | 209—244 X |
| 1,310,543 | 7/1919 | Racy | 209—337 X |
| 3,129,167 | 4/1964 | Frangos | 209—342 X |

JOHN P. McINTOSH, Primary Examiner

U.S. Cl. X.R.
118—26; 209—337